United States Patent
Battistella

(10) Patent No.: US 7,302,003 B2
(45) Date of Patent: Nov. 27, 2007

(54) METHOD AND DEVICE FOR IMAGE INTERPOLATION WITH MOTION COMPENSATION

(75) Inventor: Andrea Battistella, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 713 days.

(21) Appl. No.: 10/654,582

(22) Filed: Sep. 3, 2003

(65) Prior Publication Data

US 2004/0165662 A1  Aug. 26, 2004

(30) Foreign Application Priority Data

Sep. 3, 2002  (FR) .................................. 02 10889

(51) Int. Cl.
- H04B 1/66 (2006.01)
- H04N 7/12 (2006.01)
- H04N 11/02 (2006.01)
- H04N 11/04 (2006.01)

(52) U.S. Cl. ................................. 375/240.16
(58) Field of Classification Search ............... None
See application file for complete search history.

(56) References Cited

U.S. PATENT DOCUMENTS

| | | | |
|---|---|---|---|
| 6,184,935 B1* | 2/2001 | Iaquinto et al. | 348/441 |
| 6,295,089 B1* | 9/2001 | Hoang | 348/390.1 |
| 6,931,062 B2* | 8/2005 | Zhong | 375/240.12 |

FOREIGN PATENT DOCUMENTS

EP  0 917 363  5/1999

OTHER PUBLICATIONS de Haan, G. et al. "IC For Motion-Compensated 100 Hz TV With Natural-Motion Movie-Mode", IEEE Transactions on Consumer Electronics, IEEE, Inc. New York, US, vol. 42, No. 2, May 1, 1996, pp. 165-174, XP000596762.

Han, Soo-Chul et al., "Frame-Rate Up-Conversion Using Transmitted Motion and Segmentation Fields for Very Low Bit-Rate Video Coding", Image Processing, 1997, IEEE Comput. Soc., Oct. 26-29, 1997, pp. 747-750, XP010254064.

Chen, Yen-Kuang et al. "Frame-Rate Up-Conversion Using Transmitted True Motion Vectors", IEEE workshop on Multimedia Signal Processing, Los Angeles, CA 1998.

French Preliminary Search Report dated May 21, 2003 for French Application No. 0210889.

* cited by examiner

Primary Examiner—Nhon Diep
(74) Attorney, Agent, or Firm—Lisa K. Jorgenson; Jon A. Gibbons; Fleit Kain Gibbons Gutman Bongini & Bianco P.L.

(57) ABSTRACT

A method of interpolating images intended to be incorporated, into a sequence of moving images, each between a first original image and a second original image of the sequence, comprises an estimation of a motion vector associated with a given pixel block of a current interpolated image. This estimation comprises the preselection of P first motion vectors associated with first other pixel blocks that are adjacent to the given pixel block in the current interpolated image, for which there is already an estimated motion vector. It also comprises the preselection of at most Q second motion vectors associated respectively with second other pixel blocks adjacent to the given pixel block in the preceding interpolated image. Finally, it comprises the selection of the motion vector which minimizes a cost function from the first and second preselected motion vectors.

22 Claims, 8 Drawing Sheets

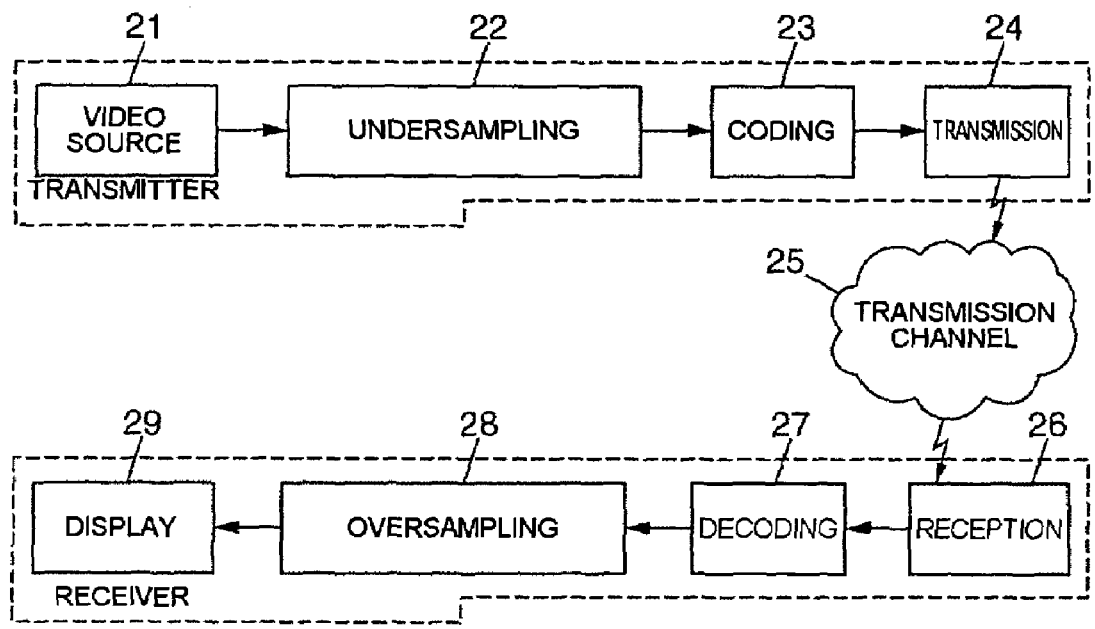
FIG. 2
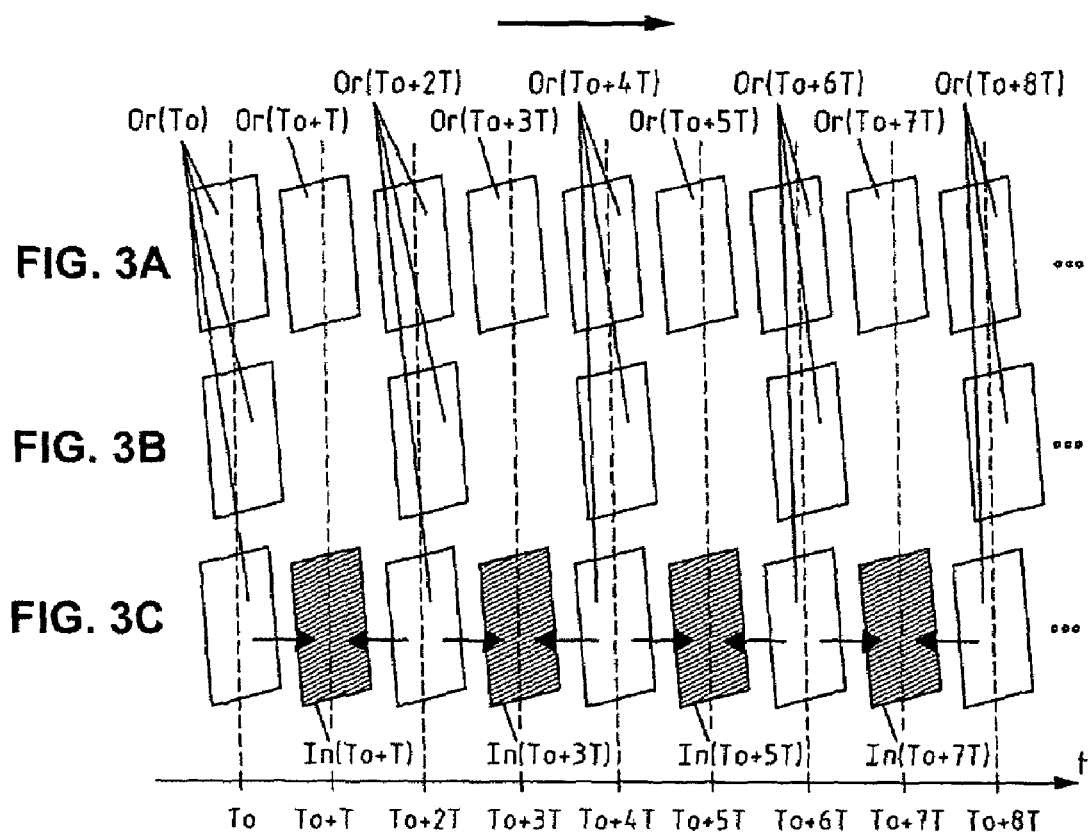
FIG. 3A
FIG. 3B
FIG. 3C

ABSTRACT

METHOD AND DEVICE FOR IMAGE INTERPOLATION WITH MOTION COMPENSATION

CROSS-REFERENCE TO RELATED APPLICATIONS

This application is based upon and claims priority from prior French Patent Application No. 0210889 filed on Sep. 3, 2002, the entire disclosure of which is herein incorporated by reference.

FIELD OF THE INVENTION

The present invention generally relates to the field of displaying a video and more particularly to interpolating a series of video images for display.

BACKGROUND OF THE INVENTION

The term "communicating terminal" is understood to mean any equipment able to receive data coding a video and able to decode this data for the purpose of displaying a video. The terminal may be an item of wireless equipment (for example, a mobile telephone, a personal digital assistant, etc.) and/or a wired apparatus that can be connected to a network (such as a computer, a television equipped with a digital decoder, etc.). However, the invention is particularly advantageous in applications in wireless equipment for which the use of a limited bandwidth and low power consumption are key factors.

The term "video" is understood to mean a sequence of moving images, as may be produced by a video source, such as a digital video camera or digital image synthesis software, and then subjected to any kind of processing before being displayed or stored on a data medium. Each image comprises a number of pixels (a pixel is the smallest element of an image) which depends on the resolution of the digital video source. The resolution is thus expressed as the number of pixels (width by height) of the images.

In a typical video application, the information needed to define the pixels of an entire image are coded and transmitted in a data entity called a frame (at least in the case of a progressive display system).

Second-generation telecommunication systems, such as GSM (Global System for Mobile communications) allow wireless transmission of voice-coded data. However, the data processing capabilities of second-generation systems are limited. This is why third-generation systems such as UMTS (Universal Mobile Telecommunication System) will allow high-datarate services to be provided, for which fixed or moving images of high quality will be able to be transmitted, especially for allowing access to the Internet. The UMTS market, thanks to its multimedia functionalities, will offer new opportunities for content and application providers, operators and manufacturers.

In this context, the quality of the videos displayed on the screen of the telecommunication terminals represents a major challenge for manufacturers. In multimedia applications (videoconferencing, video telephony, video clips, etc.), two principal aspects influence the displayed video quality:
- on the one hand, the image resolution, that is to say the number of pixels which are coded and transmitted in one frame; and
- on the other hand, the frame rate (for a progressive display system), that is to say the number of images coded and transmitted per time unit.

UMTS should offer a data transfer rate of up to 384 kB/s (kilobytes per second). With such a bandwidth, QCIF (Quarter Common Intermediate Format) images can be transmitted only with a frame rate of 15 ips (images per second).

The QCIF is a format recommended by recommendation H261 of the UIT-T (which is the video component of the UIT-T standard H320) relating to video coding for audio-visual services, such as videoconferencing. The size of a QCIF image is equal to 144×176 pixels (i.e. 144 lines by 176 columns), the recommended frame rate being 30 ips.

Consequently, the frame rate of images output by a digital video source producing QCIF images will be divided by two, on the transmitter side, in order to go from 30 ips to 15 ips. This is easily obtained by removing every other image. This operation corresponds to undersampling of the video.

Of course, the quality of the video displayed decreases when the frame rate decreases. This is illustrated by the diagrams in FIGS. 1A and 1B. These figures represent, side by side, successive views of a display screen on which a video showing the fall of an object (a ball) onto the ground are displayed, with a non-zero angle to the vertical and from left to right with respect to the observer. In each figure, a rectangle to the left of the "=" sign corresponds to the display of an image. The horizontal arrow above the images of FIG. 1A indicates the order in which the images are displayed on the screen. In each figure, the rectangle Res on the right of the "=" sign represents diagrammatically the display of an image resulting from the superposition of the successive images whose display is illustrated to the left of this sign. This resulting image is used to illustrate the visual effect reproduced when displaying the video (taking persistence of vision into account).

FIG. 1A shows, side by side, views of the display screen on which the images of the video at times t, such that $t=T_0$, $t=T_0+T$, $t=T_0+2T$, $t=T_0+3T$, $t=$to $+4T$, $t=T_0+5T$, etc. respectively, are displayed. These images are, for example, QCIF images produced by a video source having a frame rate of 30 ips and are displayed at this rate, that is to say T =33.33 ms (milliseconds). Hereafter, these images will be called original images.

FIG. 1B shows the same views of the screen as FIG. 1A when the video undergoes, on the transmitter side, undersampling, causing the frame rate to drop to 15 ips (i.e. the frame rate is reduced by a factor of 2). Thus, as shown, only every other image is displayed, at times $T_0$, $T_0+2T$, $T_0+4T$, etc. It follows that the resulting image Res is affected by a flicker effect.

To alleviate this drawback, it is required to replace the missing original images with other images, which are generated, on the receiver side, in particular from the original images transmitted. Advantageously, the frame rate is increased by a factor of two, generating images that are each intended to be integrated between two consecutive original images in the video to be displayed. This operation corresponds to oversampling of the video transmitted.

Thus, it is known to use a frame repetition algorithm, which allows each image to be displayed twice in succession. In other words, this algorithm allows the same original image to be displayed at times $T_0+$ and $T_0+T$, then the next original image at times $T_0+2T$ and $T_0+3T$, then the next original image at times $T_0+4T$ and $T_0+5T$, etc. The effect of this algorithm is illustrated by the diagram in FIG. 1C.

Frame repetition is easy to implement but does have, nevertheless, the drawback of introducing a jerky motion effect when displaying the video, as illustrated by the resulting image Res in FIG. 2C. This is why frame repetition is satisfactory only for images that are stationary or moving very little.

It is also known to use an image interpolation algorithm. Such an algorithm generates interpolated images that approximate as far as possible the missing original images, these being displayed at the times $T_0+T$, $T_0+3T$, $T_0+5T$, etc. For this purpose, an interpolation function is used. This function is such that, at the aforementioned times t, there is the following equation for each pixel:

$$In(t)=F(Or(t-T),Or(t+T)) \qquad (1)$$

where In(t) denotes the interpolated image displayed at time t;

Or(t−T) denotes the original image displayed at time t−T;
Or(t+T) denotes the original image displayed at time t+T; and F denotes the interpolation function.

A conventional example of an interpolation function is the static mean function, denoted Fstat hereafter. This function is such that:

$$Fstat(Or(t-T), Or(t+T)) = \frac{1}{2} \times (Or(t-T) + Or(t+T)) \qquad (2)$$

Stated differently, the value of each pixel of the interpolated image In(t) is equal to the weighted (mean) sum of the value of the corresponding pixels of the original images Or(t−T) and Or(t+T). A performance of such a function is good provided that the motion of the elements in the video is slight. By contrast, if the motion is considerable, the correlation between the original images Or(t−T) and Or(t+T) may be insufficient to obtain a good interpolation result.

This is why it has already been proposed to use an algorithm for image interpolation with motion compensation, based on motion vectors which are received in coded form with the data of the original images transmitted. Reference may be made, for example, to the article by Y. K. Chen, A. Vetro, H. Sun and S. Y. Kung, "*Frame-Rate Up-Conversion Using Transmitted True Motion Vectors*", IEEE Workshop on Multimedia Signal Processing", 1998. In this case, the interpolation function produces the value of the pixels of the interpolated image In(t) from the value of the pixels of one or both of the original images Or(t−T) and Or(t+T) received and decoded and also from the motion vectors received and decoded.

The effect of such an interpolation algorithm with motion compensation is illustrated by the diagram in FIG. 1D.

The drawback with the algorithm described in the aforementioned article is that it depends significantly on the video coding standard, as regards the definition and the mode of estimating the motion vectors. This may, for example, be the MPEG-4 standard. Another drawback of such an algorithm is that it applies only to videos produced according to a coding standard based on estimation and/or compensation of the motion of the image and by means of which coding standard motion vectors are generated. However, all coding standards are not based on such a principle. For example, wavelet coding methodology does not provide for such a motion estimation.

Alternatively, it would be conceivable to use an image interpolation technique with motion compensation which comprises an estimation of the motion vectors only from the original images as received and decoded. This estimation may comprise the full searching for each pixel block of a first decoded original image in a second decoded original image or else in part of the latter, called a search window (a technique called full search).

However, this method of estimation requires a large number of calculations. It is because of this requirement why this method is rarely applied to portable video devices. The calculations are performed by a computer of the portable video device or telecommunication terminal, which consumes more power the larger the number of calculations to be performed. However, since the terminal is supplied by an autonomous power supply such as a rechargeable battery, it is necessary to limit the power consumption in order not to reduce the autonomy of the equipment.

Accordingly, what is needed is a method and device to overcome the shortcomings and problems with the prior art and to provide estimation of motion vectors, which requires fewer calculations.

SUMMARY OF THE INVENTION

A first aspect of the invention relates to a method of interpolating images intended to be integrated in a sequence of moving images, each between a first original image and a second original image of the sequence, of the type comprising an estimation of at least one motion vector associated with at least one pixel of a current interpolated image, characterized in that the estimation of the motion vector associated with a given pixel block of the current interpolated image comprises the following steps:

a) of preselecting at most a given number P of first motion vectors associated respectively with first other pixel blocks that are adjacent to the given pixel block in the current interpolated image, where P is a given integer, for which there is already an estimated motion vector;

b) of preselecting at most a given number Q of second motion vectors associated respectively with second other pixel blocks that are adjacent to the given pixel block in the previous interpolated image, where Q is a given integer; and c) of selecting, from the first motion vectors and the second motion vectors, the motion vector which minimizes a cost function between, on the one hand, the pixels of a first given pixel block, which is pointed into the first original image by the motion vector from the given pixel block of the current interpolated image and, on the other hand, the pixels of a second given pixel block, which is pointed into the second original image by the symmetrical vector of the motion vector from the given pixel block of the current interpolated image.

Advantageously, the number of calculations needed at step c) for estimating the motion vector associated with a given pixel block is relatively small (compared with the full search technique) because of the preselection of the first and second motion vectors that takes place at steps a) and b), respectively. This number is equal to P+Q.

Furthermore, the method of image interpolation with motion compensation is independent of the video coding standard, since the motion vectors associated with the pixel blocks of the interpolated image are estimated from the data of the decoded original images.

However, there is a strong correlation between, on the one hand, the given pixel block and, on the other hand, the pixel blocks associated with the first motion vectors and the pixel blocks associated with the second motion vectors. This is spatial correlation as regards the pixel blocks associated with the first motion vectors and a temporal correlation as regards the pixel blocks associated with the second motion vectors. Thus, the method benefits from the spatial and temporal correlations that exist between the pixel blocks belonging to different images of the same video sequence.

A second aspect of the invention relates to a device for interpolating images intended to be integrated in a sequence of moving images, each between a first original image and a second original image of the sequence, of the type comprising means for estimating at least one motion vector associated with at least one given pixel of a current interpolated image, characterized in that the estimation means comprise, for the estimation of a motion vector associated with a given pixel block of the current interpolated image:

first preselection means for preselecting at most a given number P of first motion vectors associated with first other pixel blocks respectively adjacent to the given pixel block in the current interpolated image, where P is a given integer, for which there is already an estimated motion vector;

second preselection means for preselecting at most a given number Q of second motion vectors associated with second other pixel blocks respectively adjacent to the given pixel block in the previous interpolated image, where Q is a given integer; and first selection means for selecting, from the first motion vectors and the second motion vectors, the motion vector which minimizes a cost function between, on the one hand, the pixels of a first given pixel block, which is pointed into the first original image by the motion vector from the given pixel block of the current interpolated image and, on the other hand, the pixels of a second given pixel block, which is pointed into the second original image by the symmetrical vector of the motion vector from the given pixel block of the current interpolated image.

A third aspect of the invention relates to a communicating terminal which comprises:

receiving means for receiving coded data corresponding to images of a video;

decoding means for decoding coded data received by the receiving means;

means for oversampling the video, comprising a device according to the second aspect; and display means for displaying the oversampled video.

BRIEF DESCRIPTION OF THE DRAWING

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

FIG. 2 is a block diagram of an example of a multimedia telecommunications system in which the invention is advantageously applicable;

FIGS. 3A to 3C are diagrams illustrating the video undersampling principle and the video oversampling principle;

DESCRIPTION OF THE PREFERRED EMBODIMENTS

Figure 1:
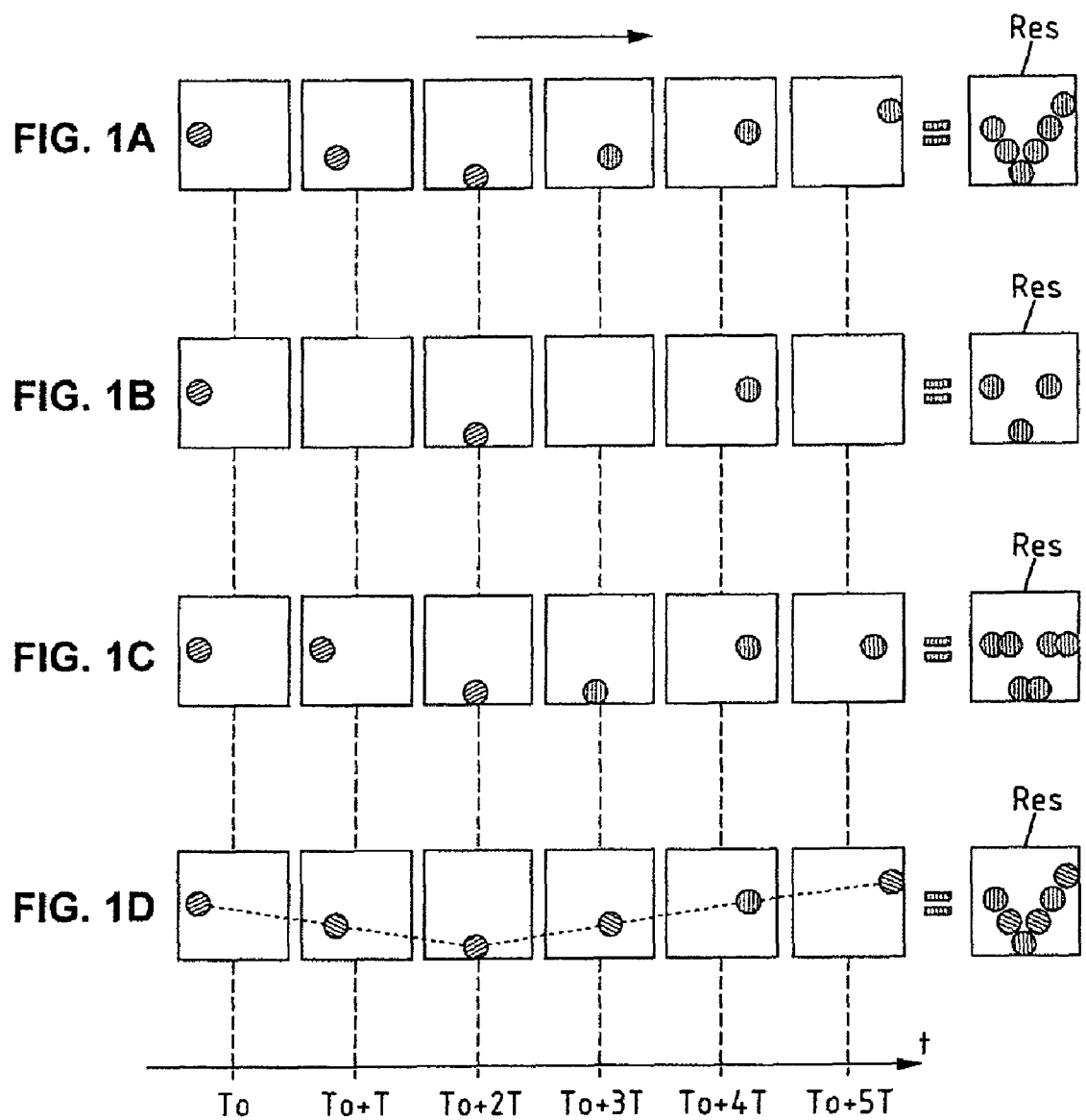
FIGS. 1A to 1D, are diagrams illustrating the effect of oversampling a video, and also the effect of frame repetition, and the effect of image interpolation with motion compensation.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

The diagram in FIG. 2 illustrates a processing chain for a video in an application of the invention to a multimedia telecommunications system. The system includes a transmitter and a receiver.

The transmitter comprises a video source 21, such as a digital video camera. It also includes undersampling means 22 for reducing the frame rate, for example for dividing it by two by eliminating every other image in the original image stream delivered by the video source 21. The transmitter also includes coding means 23 which carry out the digital coding, according to a given coding standard, of the original images after the aforementioned undersampling. The data corresponding to the images thus coded are then transmitted by transmission means 24 via a transmission channel 25.

The receiver includes receiving means 26 for receiving the coded data corresponding to the images, which are transmitted by the transmitter over the channel 25. It also includes decoding means 27, such as an image decoder, which carry out the dual operation of that carried out by the coding means 23 of the transmitter. The image decoder 27 decodes the coded data received by the receiving means 26. If the data are coded according to the MPEG-4 standard, the decoder 27 is, for example, a commercial MPEG-4 decoder. The receiver also includes video oversampling means 28. The purpose of the means 28 is to increase the video frame rate by interpolating images on the basis of the original images received and decoded. The images thus generated are intended to be integrated into the video, each between two consecutive original images. Finally, it includes display means 29 for displaying the video thus oversampled. These display means comprise, for example, a screen and an associated display management unit.

In the example of a radio telecommunications system, the transmission channel 25 comprises the air interface and, where appropriate, one or more fixed networks. The receiver is, for example, a portable telecommunications terminal (mobile telephone or the like) provided with means for access to the Internet. The transmitter may be shared between several items of equipment to allow video broadcasting via the Internet.

The invention will be described below in an example corresponding to a video display system called a progressive display system, which sequentially displays all the lines of the image (1, 2, 3, etc.) in a single scan of the screen, contrary to interlaced displaying. Interlaced displaying is another form of video displaying in which an image is displayed in two scans of half-frames (the case of television). An interlaced image is thus displayed in two frames: one frame for the odd lines (lines 1, 3, 5, etc.) followed by another frame for the even lines (lines 2, 4, etc.). The invention may also apply to interlaced display systems, although the interlacing of the lines then needs to be taken into account in the motion estimation algorithm, for example by providing suitable storage means and by taking account of the motion between the two half-frames of the same image.

There is an order of transmission, via the transmission channel, of the original images of an undersampled video. In one example, the order of transmission of the images corresponds to an order of displaying the images of the video, which of course corresponds to the order in which the images are generated and output by the video source.

Hereafter the terms such as "prior", "subsequent", "successive", "consecutive", "next", "preceding", "first" and "last", together with derivatives thereof, when they appear in relation to images, are used with reference to the order of displaying the video images and/or the order of transmitting the coded original images via the channel.

The interpolation method of the invention produces an oversampling of the video consisting of only the original images transmitted. It is used to generate images intended to be integrated into the video to be displayed, each one between a first original image and a second original image of the video, which are transmitted in succession via the channel. The method is used, on the receiver side, after the transmitted original images have been received and decoded.

The images are transmitted in coded form. The method of the invention is a post-processing method in the meaning that it is carried out on the basis of the data of the decoded original images. This is why it is independent of the image coding standard. In one example, the images are considered as being coded according to the MPEG-4 standard, and are in the QCIF format, that is they are composed of matrices of 144 lines by 176 columns of pixels. Hereinafter, indices i and j are used to identify the position of a given pixel in a given image or in a given pixel block of this image. The value of a given pixel, denoted P(i,j) hereinafter, corresponds to a luminance value for this pixel.

Using the jargon of those skilled in the art, an 8×8 pixel matrix is called a pixel block and a 16×16 pixel matrix is called a pixel macroblock. The processing proposed is preferably carried out within pixel macroblocks. However, for the sake of generality, the term "block" denotes hereafter a matrix of M×N pixels, where M and N are given integers corresponding to the height and to the width of the pixel block, respectively. This is because the processing carried out in accordance with the invention may apply to pixel matrices of any given size, so that the expression "pixel blocks" is not limiting. In a preferred example, M and N are equal to 16 (M=N=16). There are therefore 11×9 such pixel blocks in a QCIF image (9 blocks per line and 11 blocks per column). Hereinafter, indices x and y are used to identify the position of a given pixel block in an image (x being the number of the block along the line and y being the number of the block along the column) and B(x,y) denotes this pixel block.

By convention, we consider an illustrative example in which the video information corresponding to the pixel blocks of a given image are processed sequentially, from the top down and from left to right. The terms such as "neighboring", "adjacent", "next", "preceding", "first" and "last", together with derivatives thereof, are used with reference to this convention when they appear in relation to pixel blocks. Thus, the block B(1,1) is the pixel block located at the top left of the image (first pixel block of the image), the block B(1,11) is the pixel block located at the top right of the image, the block B(9,1) is the pixel block located at the bottom left of the image and the block B(9,11) is the pixel block located at the bottom right of the image (last pixel block of the image).

FIG. 3A shows part of an image stream output by the digital video source 21, having for example a frame rate of 30 ips. This image stream forms what is called hereinafter the original video. The horizontal arrow shown above FIG. 3A indicates the order of the images of the original video. In the following and in the figures, T denotes the period between two consecutive images of the original video. Stated differently, the frame rate of the original video is 1/T.

More particularly, that part of the image stream shown in FIG. 3A corresponds to the start of a given sequence of images. The first image of this stream (furthest to the left) is the first image of the sequence. To denotes the instant when the first image of the sequence is displayed and Or(t) denotes the images of the original video at times t, such that $t=T_0$, $t=T_0+T$, $t=T_0+2T$, $t=T_0+3T$, etc.

FIG. 3B shows the images of the image stream of FIG. 3A which remain after undersampling of the original video, in the case in which this undersampling consists in eliminating every other image in the image stream. It is the images $Or(T_0)$, $Or(T_0+2T)$, $Or(T_0+4T)$, etc. which form the image stream delivered by the undersampling means 22 of the transmitter (FIG. 2). Only these original images are transmitted in coded form via the transmission channel 25. After these images have been decoded by decoding means 27 of the receiver, they form the core of the video to be displayed. These images are available, on the receiver side, with a frame rate of ½T, that is with a frame rate of 15 ips in the example.

The image interpolation method according to the invention is used to generate images intended to be integrated into the stream of original images, each between a first original image and a second original image, so as to form, in combination with the original images, the video to be displayed. Such an interpolation method is used by a suitable device within the means 28 for oversampling the stream of original images received and decoded.

FIG. 3C shows the images of the video to be displayed, which form the stream of images output by the oversampling means 28 of the receiver. $In(T_0+T)$, $In(T_0+3T)$, $In(T_0+5T)$, etc. denote the images generated by the method according to the invention. Hereinafter, these images are called interpolated images. Thus, this figure shows that the interpolated images alternate with the original images in the video to be displayed. In the figure, the horizontal arrows show symbolically relationships that exist between the original images and the interpolated images. For example, the interpolated image $In(T_0+3T)$ resulting from interpolation between the original images $Or(T_0+2T)$ and $Or(T_0+4T)$ is shown symbolically by the two arrows, one pointing towards the image In($T_0$+3T) from the image Or($T_0$+2T) and the other from the image Or($T_0$+4T).

The image interpolation method is based on a recursive-type algorithm in the meaning that it takes into account, at each step of the processing, the results obtained at least one prior step. The processing is therefore valid only for images of the same image sequence, that is images corresponding to scene unity. In the event of a scene cut, there is in general little, if not no, correlation between the two images before and after the cut respectively, so that the algorithm must be reset.

Figure 4A:
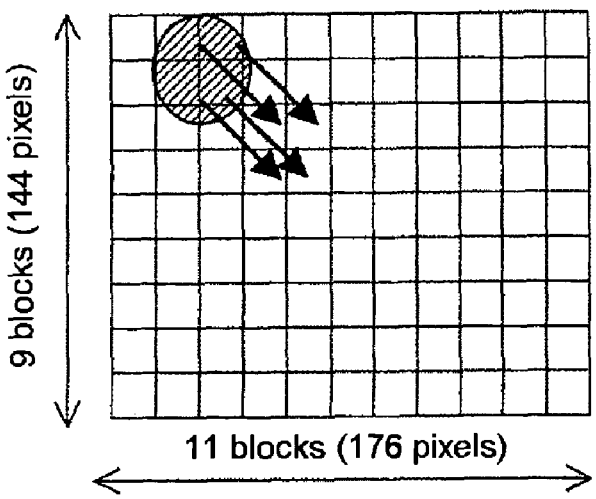
FIGS. 4A and 4C are representations of three successive images of the same video sequence, which illustrate the spatial correlation and the temporal correlation that exist between these images.
Figure 4B:
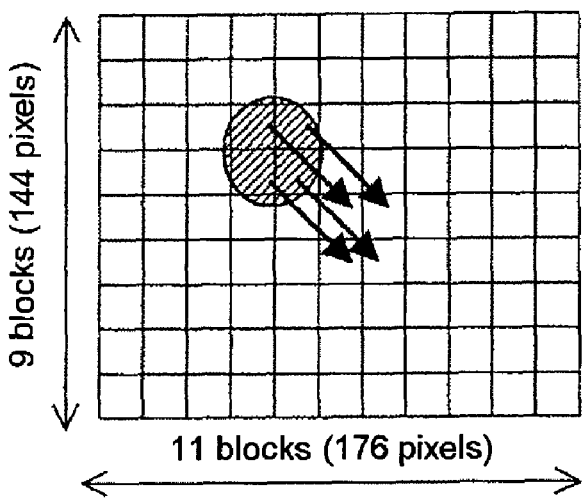

The diagrams of FIGS. 4A and 4B are used to illustrate the spatial and temporal correlations between pixel blocks of successive images of a video. As presented in the introduction, the method of the invention is based on these correlations in order to reduce the number of calculations needed to estimate the motion vectors. These figures show three successive images of a video sequence (original images) showing the fall of a ball at an approximately constant speed, as already illustrated by the diagrams of FIGS. 1A to 1D.

In each of FIGS. 4A to 4B, the representation of the ball occupies roughly four pixel blocks. These are the blocks B(1,2), B(1,3), B(2,2) and B(2,3) in FIG. 4A, the blocks B(3,4), B(3,5), B(4,4) and B(4,5) in FIG. 4B and the blocks B(5,6), B(5,7), B(6,6) and B(6,7) in FIG. 4C. Motion vectors associated with each of the blocks are schematically represented by arrows. In this example, a motion vector associated with a first given pixel block of a given image points towards a second given pixel block in which it may be estimated that, in the next image, the pixels of the given pixel block will be displaced.

As shown, it may be seen that the four aforementioned pixel blocks have, in each image, respective associated motion vectors having approximately the same values. This is a reflection of the spatial correlation between the pixel blocks of an image. By comparing the images shown in each of the figures, it may furthermore be seen that the motion vectors associated with each pixel block retain approximately the same value from one image to the next image. This is a reflection of the temporal correlation between the pixel blocks of one image to the next.

Figure 4C:
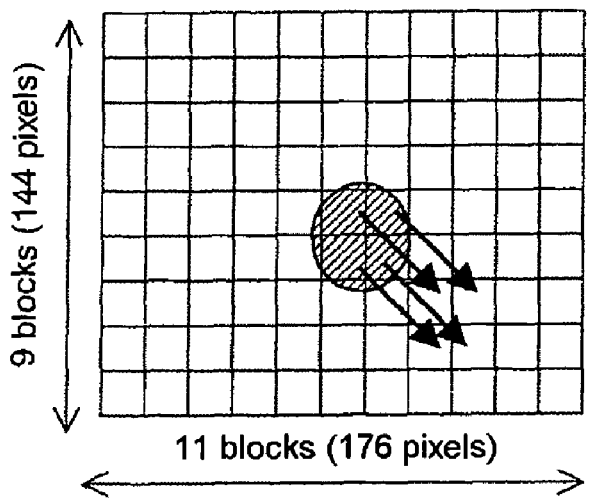

Of course, in the general case the aforementioned spatial and temporal correlations are not always as precise as in the intentionally explanatory case of the four pixel blocks considered above with reference to FIGS. 4A to 4C. Nevertheless, the invention makes use of the idea that may reasonably be assumed that such correlations exist in any video sequence. In practice, it has been found in various video samples that the invention does provide good results, which means that the assumption is realistic.

Figure 5:
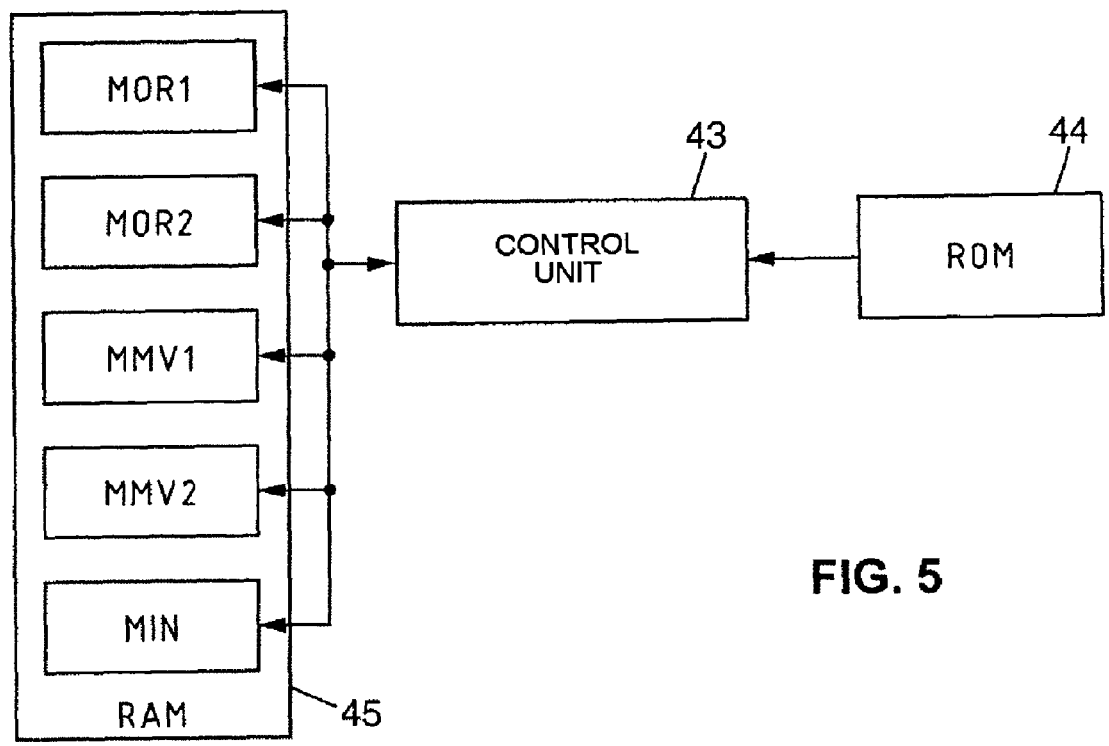
FIG. 5 is a block diagram of an example of a device for implementing the interpolation method according to the invention.

FIG. 5 shows schematically the means that form a device for implementing the method according to the invention. Such a device is included within the oversampling means 28 (FIG. 2).

The device comprises a control unit 43 connected to a read-only memory (ROM) 44 and to a random-access memory (RAM) 45. An application program is stored in the memory 44. When it is executed by the control unit 43, this application program implements the image interpolation method according to the invention.

The memory 45 is subdivided into several memory spaces MOR1, MOR2, MMV1, MMV2 and MIN, to which reference will be made later, and in each of which memories temporary data is stored during execution of the application program.

In one example, the control unit 43, the memory 44 and the memory 45 may form part of one and the same circuit, such as a microcontroller. As a variant, the control unit 43 is a microprocessor, and the memories 44 and 45 are components incorporated within respective integrated-circuit packages.

The method is an interpolation method with motion compensation. An image is interpolated pixel block by pixel block. The image during interpolation at time t is called the current interpolated image and is denoted by In(t). In addition, the original images are called and denoted, respectively, the preceding original image Or(t−T) and the next original image Or(t+T), between which the current interpolated image In(t) is intended to be incorporated into the video to be displayed.

The values of the pixels of the preceding original image Or(t−T), after this image has been decoded, are stored in the memory space MOR1 of the memory 45. Likewise, the values of the pixels of the next original image Or(t+T), after this image has been decoded, are stored in the memory space MOR2 of the memory 45. A storage capacity of 176×144 values is allocated in the memory 45 to each of the memory spaces MOR1 and MOR2.

The method comprises, for at least one given pixel block of the current interpolated image In(t), and preferably for each of the pixel blocks of this image, an estimation of a motion vector associated with this pixel block. Hereinafter, a pair m,n of coordinates m and n denotes the motion vector associated with a given pixel block of the current interpolated image In(t) (where m and n are relative integers). The coordinates m and n correspond to the number of lines and the number of columns respectively, one pixel of which is displaced when it is translated by the vector translation along the vector. By convention, a positive value and a negative value of the number m correspond to an upward and to an downward displacement in the image, respectively. Likewise, a positive and a negative value of the number n correspond to a displacement to the right and to the left in the image, respectively.

In the memory 45, a storage capacity of 9×11 pairs of values is allocated to each of the memory spaces MMV1 and MMV2, in order to allow the pairs of coordinates m,n of the motion vectors associated with the 9×11 pixel blocks of an interpolated image, respectively, to be stored.

The technique according to the invention will now be described by considering what takes place when interpolating an image intended to be displayed at a given time t different from $T_0$+T. During interpolation, this image is denoted In(t) and will, hereinafter, be called the current interpolated image. The interpolation of the image In(t) is performed on the basis of the preceding original image Or(t−T) and the next original image Or(t+T) and on the basis of the motion vectors associated with the pixel blocks of the current interpolated image ln(t). These vectors must be estimated beforehand, using the estimation technique forming the subject of the present invention.

In the memory 45, a storage capacity is allocated to the memory space MIN in order to allow 144×176 pixel values of the current interpolated image In(t) to be stored.

The estimation of the motion vector associated with a given pixel block consists in selecting a given motion vector from a set of possible motion vectors. The motion vector m,n selected is that one which minimizes a cost function between, on the one hand, the pixels of the pixel block pointed into the preceding original image by the motion vector on the basis of the given pixel block of the current interpolated image and, on the other hand, the pixels of the pixel block pointed into the next original image by the symmetrical vector of the motion vector on the basis of the given pixel block of the current interpolated image.

In one example, the cost function is defined by the "sum of absolute differences" or SAD estimator given by the relation:

$$SAD_{m,n} = \sum_{j=1}^{N} \sum_{i=1}^{M} |P1(i-m, j-n, t-T) - P2(i+m, j+n, t+T)| \qquad (3)$$

where $P1(i-m,j-n,t-T)$ denotes the value of the pixel of indices $i-m$ and $j-n$ of the pixel block in question of the preceding original image $(Or(t-T))$;

where $P2(i+m,j+n,t+T)$ denotes the value of the pixel of indices $i+m$ and $j+n$ of the pixel block in question of the next original image $(Or(t+T))$, and where m and n are relative integers which denote the coordinates of the motion vector.

In other words, the motion vector m,n selected is that one which minimizes the value $SAD_{m,n}$ of the SAD estimator applied to the pixel block in question, this value being given by the above relation (3).

According to the known full search technique, the SAD estimator would be calculated, for a given pixel block of the original image $Or(t-T)$, with respect to all the blocks of the original image $Or(t+T)$, or at least all of the pixel blocks of this original image within a search window centered on the given block.

The invention is based on another technique, which allows the number of calculations of the value of the SAD estimator to be limited. This is because the estimation of the motion vectors according to the invention comprises either or both of the two motion vector preselection steps already available, followed by a step of selecting, from the motion vectors thus preselected, that which minimizes the cost function given by the above relation (3).

Figure 6:
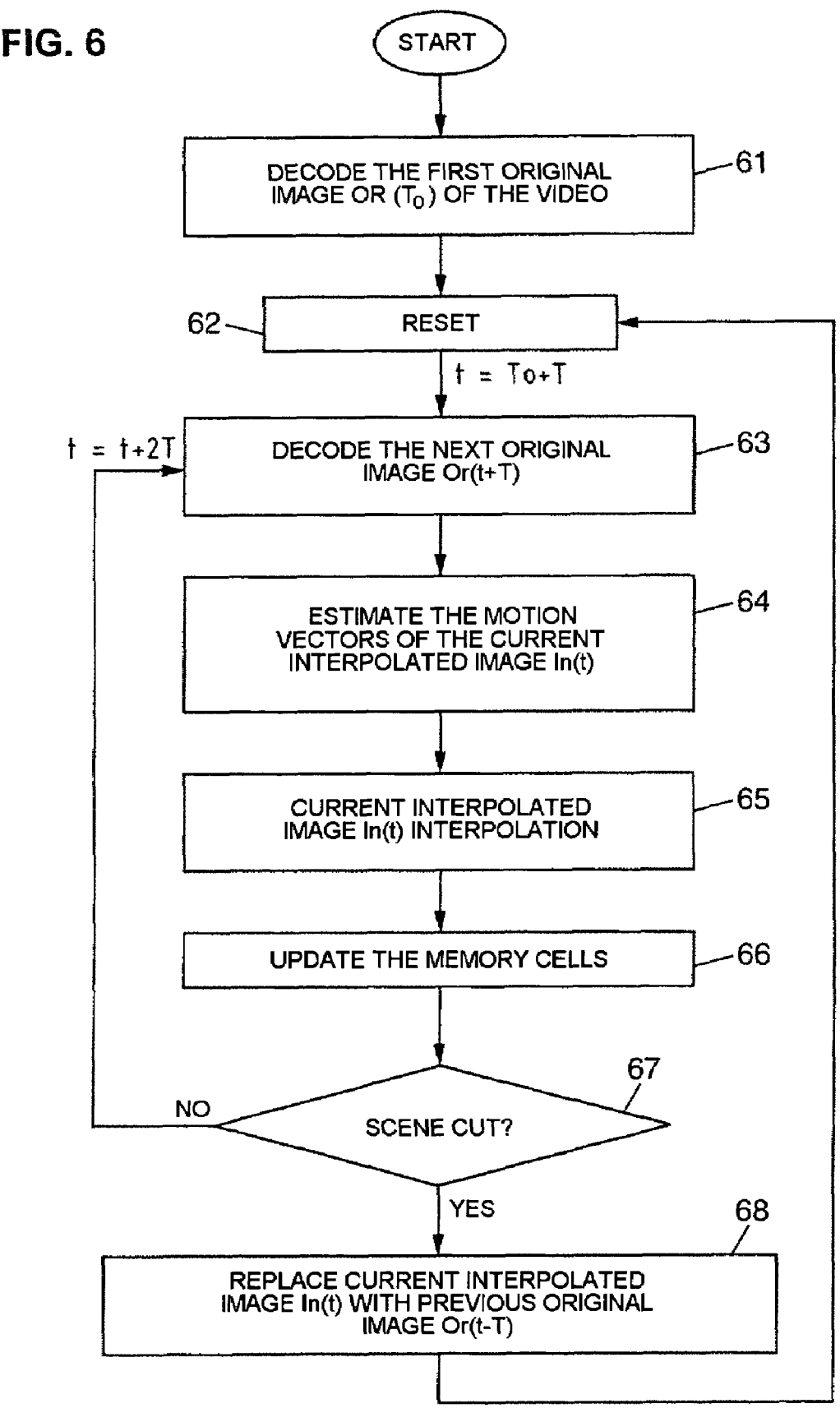
FIG. 6 is a diagram of the steps illustrating an example of an interpolation method according to the invention.

FIG. 6 shows a flow diagram illustrating the steps of an image interpolation method according to the invention.

In a first step 61, the first original image $Or(T_0)$ of the first sequence of the video is decoded. The values of the pixels of this image are stored in the memory space MOR1 of the memory 45.

In a reset step 62, the memory spaces MOR2 and MIN, together with the memory spaces MMV1 and MMV2 of the memory 45 are reset. The pixel values stored in the memory spaces MOR2 and MIN and the motion vector values stored in the memory spaces MMV1 and MMV2 are set to zero. Once these resetting operations have been carried out, the first occurrence of the recursive algorithm may be executed.

An occurrence of the algorithm will now be described with regard to the interpolation of a current interpolated image In(t) intended to be displayed at a given time t (the general case), recognizing that, at the first occurrence of the algorithm, the time t is equal to $T_0+T$, at the second occurrence of the algorithm, the time t is equal to $T_0+3T$, at the third occurrence of the algorithm, the time t is equal to $T_0+5T$, etc.

In a step 63, the next original image $Or(t+T)$ is decoded. The values of the pixels of this image are stored in the memory space MOR2. Data of two successive original images, namely the original image $Or(t-T)$ and the original image $Or(t+T)$, are thus stored in the memory spaces MOR1 and MOR2. Consequently, it is possible to interpolate the current interpolated image In(t), which is intended to be incorporated into the video to be displayed between these two original images.

According to the invention, prior to this interpolation, a step 64 of estimating the motion vectors associated with pixel blocks of the current interpolated image In(t) is carried out. It will be recalled that, according to the invention, such a motion vector is determined for each pixel block B(x,y) of the image In(t), where x is an integer between 1 and 11 and y is an integer between 1 and 9.

Figure 7:
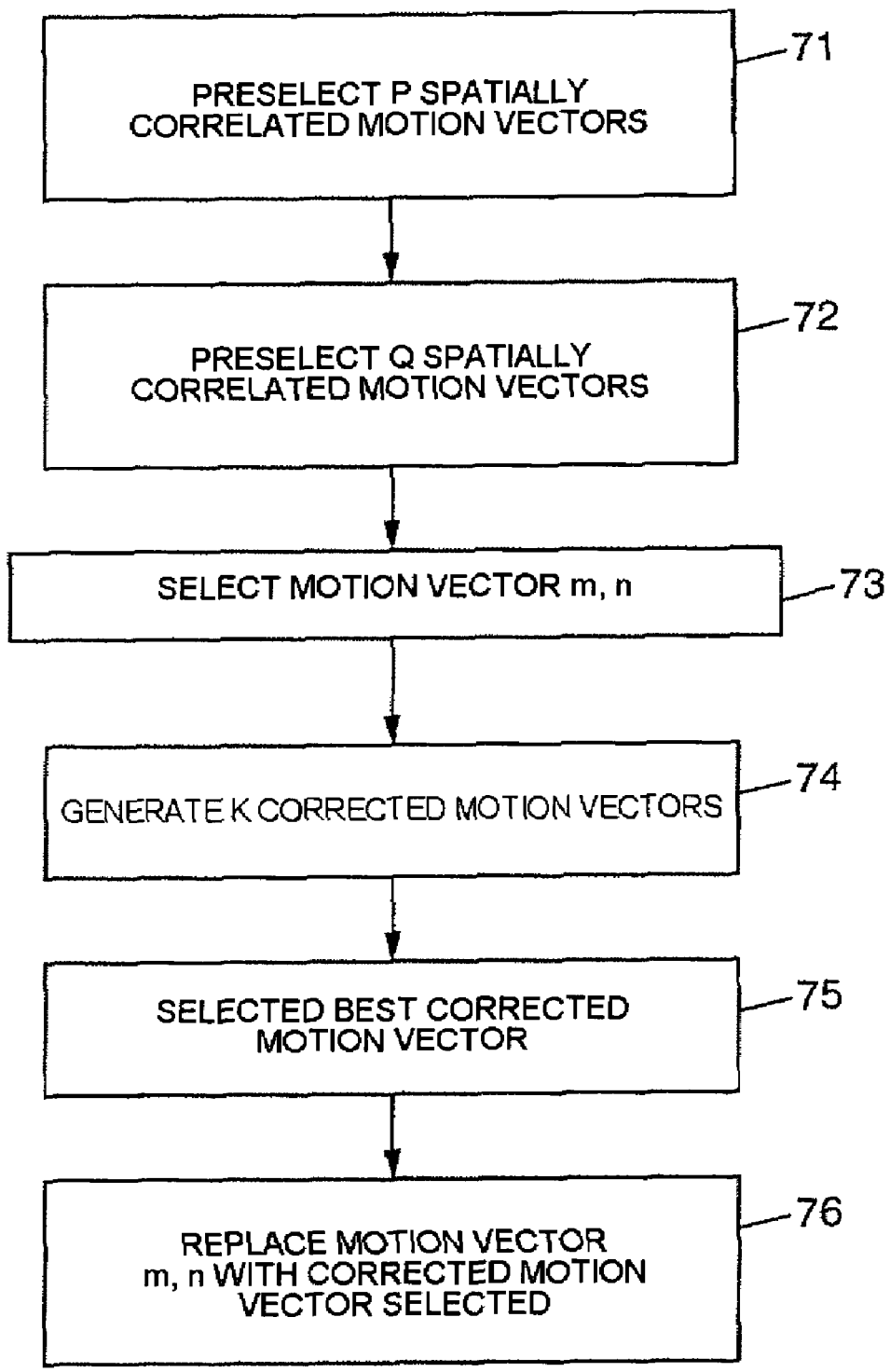
FIG. 7 is a diagram of the steps illustrating an example of how the motion vector estimation according to the invention is employed.

This estimation step 64 will now be described in detail with reference to the flow diagram of FIG. 7, and also with reference to the diagram of FIG. 8 which illustrates a preferred embodiment.

The estimation step 64 is itself recursive, in the sense that it carries out processing pixel block by pixel block and in the sense that the processing of a pixel block takes into account the results obtained for one or more preceding pixel blocks (only when, of course, such results are available). Hereinafter, we consider the processing associated with the estimation of the motion vector of a given pixel block B(x,y) of the image.

In a first preselection step 71, at most a given number P of first motion vectors associated with respectively other pixel blocks neighboring the pixel block B(x,y) in the current interpolated image In(t) is preselected, where P is a given integer, for which there is already an estimated motion vector. There is a spatial correlation between these first other pixel blocks and the pixel block B(x,y). In one example, P is equal to 2 (P=2). The values of these first motion vectors may be read from the memory space MMV2. These motion vectors are associated with pixel blocks of the current interpolated image In(t) which have been processed beforehand.

As a variant or as a complement, in a second preselection step 72, at most a given number Q of second motion vectors associated respectively with second other pixel blocks neighboring the pixel block B(x,y) in the preceding interpolated image are preselected, where Q is a given integer, for example equal to 2 (Q=2). It should be noted that the values of these second motion vectors are already available, these being able to be read from the memory space MMV1.

The second other pixel blocks neighboring the pixel block B(x,y) are preferably different from the first other pixel blocks so as to increase the diversity of the preselected motion vectors.

However, the first and second other pixel blocks neighboring the pixel block B(x,y) are preferably adjacent to the block B(x,y) in the images, thereby guaranteeing maximum spatial correlation.

The two aforementioned features may be combined in a preferred embodiment in which P=2 and Q=2.

Figure 8:
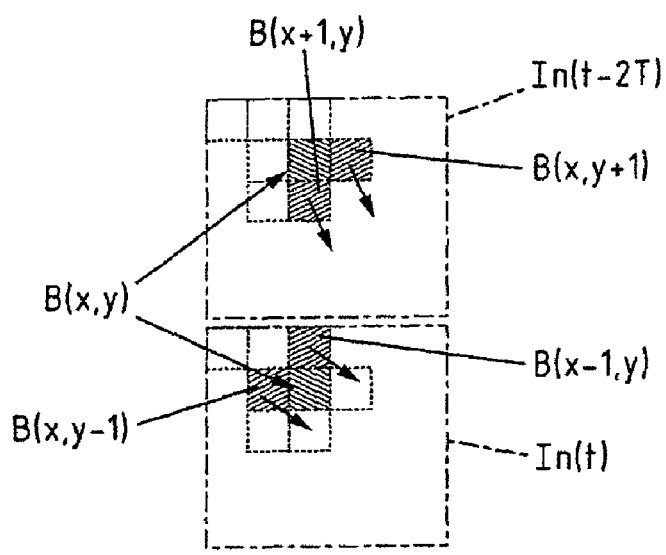
FIG. 8 is a diagram illustrating an example of motion vector preselection for estimating a motion vector associated with a given pixel block.

The diagram in FIG. 8 illustrates this preferred example. In this figure, the current interpolated image In(t) and the previous interpolated image In(t−2T) are shown partially in broken lines. In addition, the block B(x,y) is shown symbolically by a light-gray tinted square and the first and second other pixel blocks are shown by dark-gray tinted squares.

In this example, the first other pixel blocks preselected at step 71 are the pixel blocks B(x,y−1) and B(x−1,y) and the second other pixel blocks preselected at step 72 are the pixel blocks B(x+1,y) and B(x,y+1). Stated differently, x and y denoting indices identifying the position of the given pixel block B(x,y) in the images, the respective positions of the two first other pixel blocks B(x,y−1) and B(x−1,y) are identified by the indices x and y−1 and by the indices x−1 and y, respectively, and the respective positions of the two second other pixel blocks B(x+1,y) and B(x,y+1) are identified by the indices x+1 and y and by the indices x and y+1, respectively.

After steps 71 and 72, there are then, in the preferred example, four preselected motion vectors.

The estimation of the motion vector associated with the pixel block B(x,y) then comprises a step 73 of selecting, from the motion vectors thus preselected, the one which minimizes the cost function given by the abovementioned relation (3). The value of the pair of coordinates m,n of the motion vector thus selected is recorded in the memory space MMV2, at the memory location reserved for the block B(x,y).

Next, in a step 74, at most a given number K of corrected motion vectors is generated, each corrected motion vector corresponding to the motion vector m,n selected at step 73 and assigned a respective given pair of correction values.

In one example, the correction values are additive coefficients defining what is called hereinafter a refinement window. This window is defined, from the value of the pair of coordinates of the motion vector m,n, by the set of pairs of coordinates m±m1, n±n1, where m1 is an integer taking all values between 0 and M1, where n1 is an integer taking all values between 0 and N1, and where M1 and N1 are given non-zero integers.

In a step 75, the corrected motion vector which minimizes the cost function given by relation (3) indicated above is selected from the corrected motion vectors as defined above. It will be noted that the case of the pair m1,n1 equal to 0,0 is not taken into account since there is already the value of the SAD estimator for the vector m,n.

Figure 9:
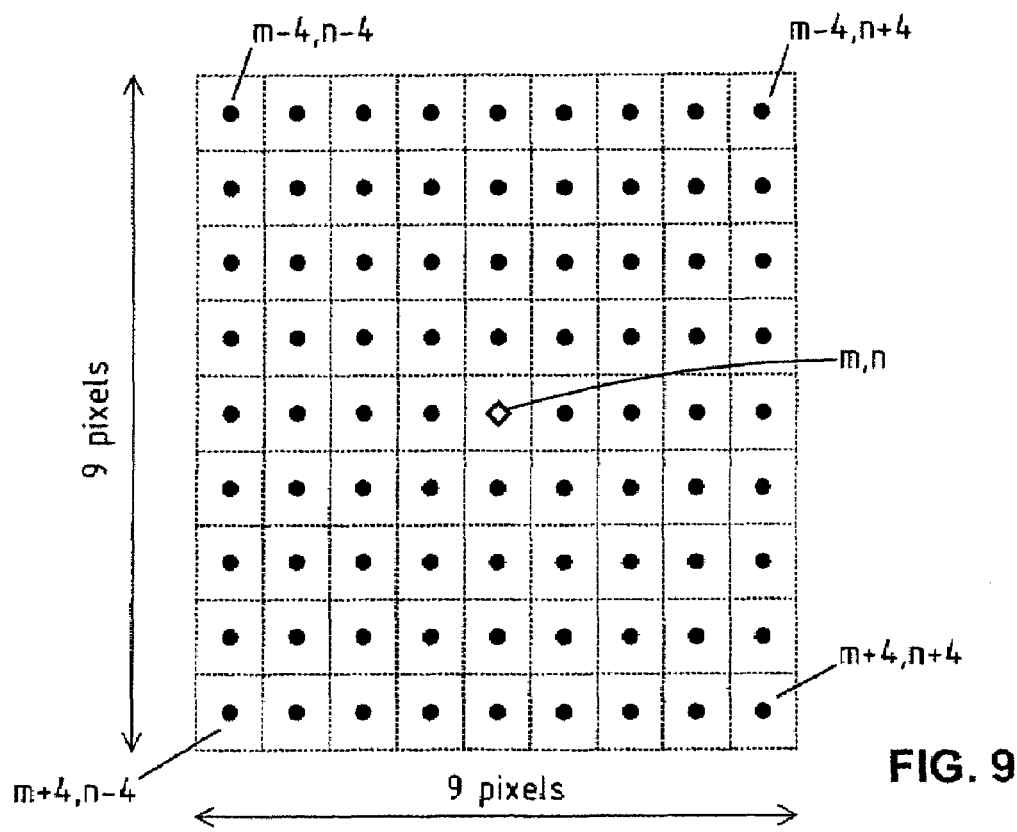
FIG. 9 is a diagram illustrating an example of a refinement window used for estimating a motion vector associated with a given pixel block.

FIG. 9 illustrates an example of a refinement window, for which M1 is equal to four (M1=4) and N1 is also equal to four (N1=4). In this figure, each point corresponds to a pair of coordinates of a corrected motion vector. The refinement window according to this example is therefore a 9×9 pixel window (9 pixels in height and 9 pixels in width). The pixel located at the center of the refinement window corresponds to the motion vector m,n selected at step 73. According to the notation convention adopted here, the top left corner of the refinement window corresponds to the corrected motion vector $m^{-4},n-4$. The top right corner of the window corresponds to the corrected motion vector $m^{-4},n+4$. The bottom left corner of the window corresponds to the corrected motion vector m+4,n−4. Finally, the bottom right corner of the window corresponds to the corrected motion vector m+4,n+4.

In this example, the number of calculations of the SAD estimator to be carried out at step 75 is equal to 80. With the four calculations carried out at step 73, there are therefore at most 84 calculations in total of the SAD estimator which are needed to estimate the motion vector associated with each pixel block of the image. This number should be compared with the 400 calculations that will be needed to carry out an estimation of the full-search type with a search window 20 pixels in width.

Figure 10:
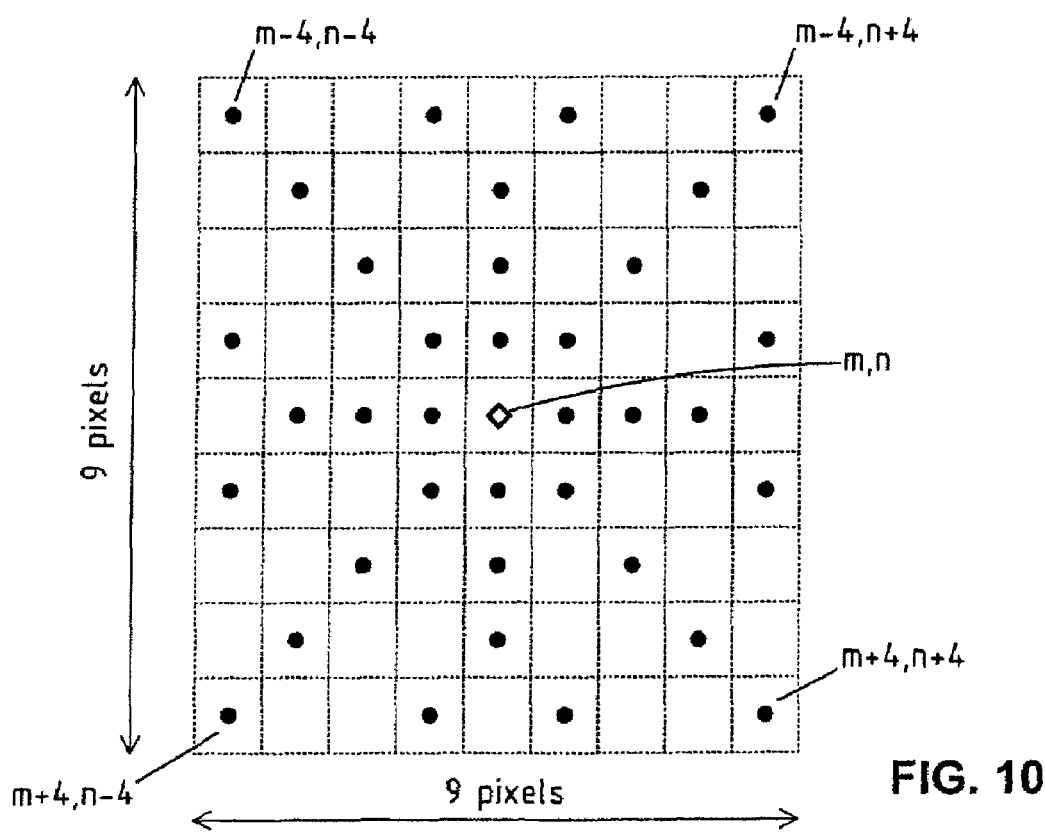
FIG. 10 is a diagram illustrating an example of an undersampled refinement window.

In a variant, which forms a preferred embodiment, the correction values are additive coefficients defining what is called hereinafter an undersampled refinement window. FIG. 10, in which the same elements as in FIG. 9 bear the same references, is an illustrative example according to this variant. Compared with the first embodiment, according to the diagram of FIG. 9, only certain pairs of coordinates involved in the 9×9 pixel refinement window are used, hence the notion of undersampling of this window. The pairs of coordinates used constitute a pattern, here termed a snowflake pattern because of its similarity with the representation of the shape of a growing snowflake. Stated differently, only some of the correction values defined by the refinement window of FIG. 9 are selected at step 75.

The advantage of this variant is that it limits the number of corrected motion vectors to 36. The number of calculations of the SAD estimator is therefore reduced to 40 (i.e. four at step 73 and 36 at step 75, without significantly impairing the precision of the estimation because of the fact that the 36 corrected motion vectors selected at step 74 are uniformly distributed within the same 9×9 pixel refinement window.

Finally, in step 76, the motion vector m,n selected at 73 is replaced, in the memory space MMV2 of the memory 45, with the corrected motion vector selected at step 75. In a first embodiment, this replacement is effected only if the corrected vector selected at step 75 gives a value of the cost function less than that given by the motion vector m,n. In a variant, the replacement is effected in all cases, thereby avoiding an additional test.

It will be noted that, for certain pixel blocks B(x,y) of the image, some of the other pixel blocks, defined as indicated above with regard to steps 71 and 72 in the example according to FIG. 8, do not exist so that associated motion vectors do not exist. These are the pixel blocks located along the border of the image (that is to say those of the first and last lines and those of the first and last columns). For these pixel blocks, the preselected motion vectors are only those that are available, so that the number of preselected motion vectors is less than four (it may be equal to three or two).

It will also be noted that, for the first interpolated image of the sequence (i.e. for t =$T_0$+T), there is no previous interpolated image so that no second motion vector can be selected at step 72. In addition, for the first block of the image, that is to say the block B(1,1), there is no pixel block in the current interpolated image for which there is already an estimated motion vector, so that no first motion vector can be selected at step 71. This therefore amounts to selecting a corrected motion vector, in accordance with step 75, for initiating the recursive algorithm. Outside the case of this block B(1,1) of the first interpolated image of the sequence, the steps 74 to 76 may be omitted.

Likewise, it may be noted that some of the corrected motion vectors, defined as indicated above with regard to step 74, do not exist (as they would fall outside the dimensions of the image), so that only those that do exist are taken into account.

This type of situation, which may be termed an "edge effect" situation, is easily treated by appropriate tests which may be inserted into the application program.

Returning to FIG. 6, the image interpolation method comprises, after step 64 of estimating the motion vectors associated with the pixel blocks of the current interpolated image In(t), a step 65 consisting in carrying out the actual interpolation of the current interpolated image In(t). The values of the pixels of this image are determined one after another and stored in the memory MIN of the memory 45.

In a first embodiment, the value Pin(i,j,t) of the pixel of indices i and j of the current interpolated image In(t) is given by the following equation:

$$Pin(i, j, t) = \frac{1}{2}(P1(i-m, j-n, t-T) + P2(i+m, j+n, t+T)) \quad (4)$$

where Pin(i,j,t) denotes the pixel of indices i and j of the current interpolated image In(t);

where P1(i−m,j−n,t−T) denotes the value of the pixel of indices i−m and j−n of the preceding original image;

where P2(i+m,j+n,t+T) denotes the value of the pixel of indices i+m and j+n of the next original image Or(t+T); and where m and denote the coordinates of the motion vector associated with the pixel block to which the pixel in question belongs, which coordinates are read from the memory MMV2.

Stated differently, the value of the pixel Pin(i,j,t) is equal to the mean of the values of the pixel P1(i−m,j−n,t−T) of indices i−m and j−n of the preceding original image Or(t−T) and of the pixel P2(i+m,j+n, t+T) of indices i+m and j+n of the next original image Or(t+T). The pixel P(i,j,t) of the current interpolated image therefore provides a balance between, on the one hand, the pixel pointed into the preceding original image by the vector −m, −n and, on the other hand, the pixel pointed into the next original image by the vector m,n.

Other embodiments are possible, especially using the properties of the median filter. The median filter is an operator which is applied to three operands A, B and C and the value of which is determined in the following manner:

$$\text{median } (A, B, C) = \begin{cases} A, & \text{if } B \leq A \leq C \text{ or } C \leq A \leq B \\ B, & \text{if } A \leq B \leq C \text{ or } C \leq B \leq A \\ C & \text{otherwise} \end{cases} \quad (5)$$

Thus, in a second embodiment, the value Pin(i,j,t) of the pixel of indices i and j of the current interpolated image In(t) is given by the following relation:

$$Pin(i, j, t) = P_{stat}(i, j, t) = \text{median}(P1(i, j, t - T), \quad (6)$$

$$P2(i, j, t + T), \frac{1}{2}(P1(i - m, j - n, t - T) +$$

$$P2(i + m, j + n, t + T)))$$

The first two operands of the median filter are in this case the values of the pixel P1(i,j,t−T) of indices i and j of the preceding original image Or(t−T) and of the pixel P2(i,j,t+T) of indices i and j of the next original image Or(t+T), that is the uncompensated values of the motion of the image. The third operand is the mean between the values of the pixel P1(i−m,j−n,t−T) of indices i−m and j−n of the preceding original image Or(t−T) and of the pixel P2(+mj+n,t+T) of indices i+m and j+n of the next original image Or(t+T) given by the above equation (4), that is the compensated values of the motion of the image.

Thus, if the value of the third operand is very different from the values of the first and second operands, because the estimation of the motion vector m,n is of poor quality, the median filter makes it possible to ignore it, since it selects either the first operand or the second operand as value of the pixel Pin(i,j,t). This embodiment therefore makes it possible to give preference to the image interpolation without motion compensation, should there be a significant difference between the results of the interpolation with and without motion compensation.

As an alternative, in a third embodiment, the value Pin(i,j,t) of the pixel of indices i and j of the current interpolated image In(t) is given by the following relation:

$$Pin(i, j, t) = P_{dyn}(, i, j, t) = \text{median } (P1(i - m, j - n, t - T), \quad (7)$$

$$P2(i + m, j + n, t + T),$$

$$\frac{1}{2}(P1(i, j, t - T) + P2(i, j, t + T)))$$

In this embodiment, the first two operands of the median filter are the values of the pixel P1(−m,j−n,t−T) of indices i−m and j−n of the preceding original image Or(t−T) and of the pixel P2(+m,j+n,t+T) of indices i+m and j+n of the next original image Or(t+T), that is the compensated values of the motion of the image. The third operand is the mean between the values of the pixel P1 (i,j,t−T) of indices i and j of the preceding original image Or(t−T) and of the pixel P2(,j,t+T) of indices i and j of the next original image Or(t+T), that is the uncompensated values of the motion of the image.

This embodiment makes it possible, unlike the previous one, to give preference to the image interpolation with motion compensation, should there be a significant difference between the results of the interpolation with and without motion compensation.

As a variant, in a fourth embodiment, the value Pin(i,j,t) of the pixel of indices i and j of the current interpolated image In(t) is given by the following relation:

$$Pin(i, j, t) = Pmid(i, j, t) = \frac{1}{2}\left(\frac{1}{2}(P1(i, j, t - T) + \quad (8)\right.$$

$$P2(i, j, t + T)) + \frac{1}{2}(P1(i - m, j - n, t - T) +$$

$$P2(i + m, j + n, t + T)))$$

Stated differently, the value Pin(i,j,t) is the mean of the two mean values, namely, on the one hand, the mean of the values of the pixel P1(i,j,t−T) of indices i and j of the preceding original image Or(t−T) and of the pixel P2(i,j,t+T) of indices i and j of the next original image Or(t+T), that is the uncompensated values of the motion of the image, and, on the other hand, the mean of the values of the pixel P1(i−m,j−n,t−T) of indices i−m and j−n of the preceding original image Or(t−T) and of the pixel P2(+m,j+n,t+T) of indices i+m and j+n of the next original image Or(t+T), that is the compensated values of the motion of the image.

Finally, a fifth embodiment allows the advantages of three of the four preceding embodiments to be combined, again using the properties of the median filter. In one example of this embodiment, the value Pin(i,j,t) of the pixel of indices i and j of the current interpolated image In(t) is given by the following relation:

$$Pin(i,j,t) = \text{median}(P_{stat}(i,j,t), P_{dyn}(i,j,t), P_{mid}(i,j,t)) \quad (9)$$

where Pstat(i,j,t), Pdyn(i,j,t) and Pmid(i,j,t) are the values given by the above relations (6), (7) and (8), respectively.

Of course, all other combinations are possible.

After interpolation step 65, the method comprises a step 66 of updating the memory spaces MOR1, MOR2, MMV1, MMV2 and MIN of the memory 45. More particularly, the memory space MOR1 is updated with values of the memory space MOR2, and the latter is then reset to zero. Likewise, the memory space MMV1 is updated with values from the memory space MMV2, and the latter is then reset to zero. Finally, the memory space MIN is reset to zero. Of course, all the variants of these operations within the scope of a person skilled in the art may be employed in so far as they allow an equivalent result to be obtained.

In a step 67, it is then determined if a scene cut is present, which is carried out by comparing the current interpolated image In(t) with the preceding original image Or(t−T).

Figure 11:
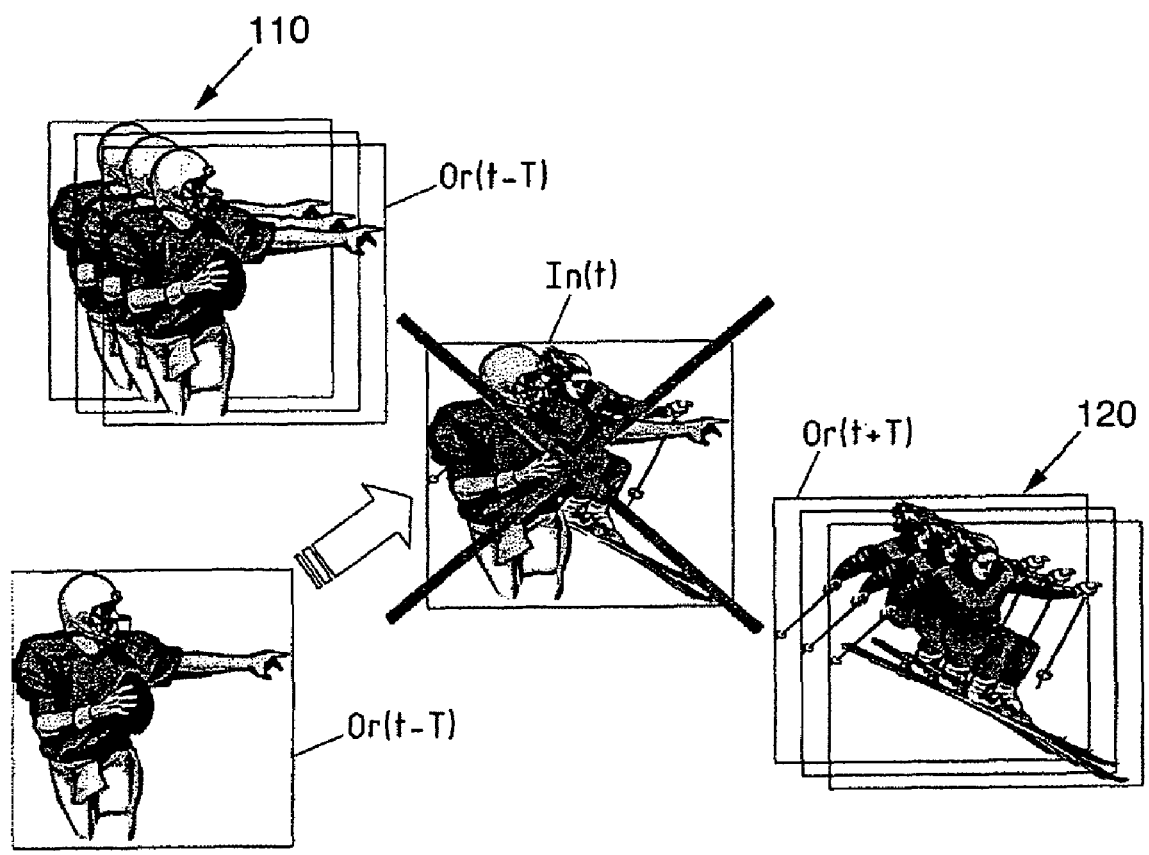
FIG. 11 is a diagram illustrating a cut from a scene in a video.

FIG. 11 illustrates, in an example that occurs when there is a break in scene between the preceding original image Or(t−T) and the next original image Or(t+T). According to this example, the image sequence 110, which terminates with the image Or(t−T), shows a footballer in action and the sequence 120, which starts with the image Or(t+T), shows a skier in action. There exists little, or even no, correlation between the elements of the images Or(t−T) and Or(t+T). Consequently, the current interpolated image In(t), which is generated from the information based on the assumption of such correlations, is not suitable for being harmoniously incorporated between the images Or(t−T) and Or(t+T). It constitutes an approximate mixing of the elements of each of the images, as shown in the figure.

This is why, in the case of a scene cut, it is appropriate not to display the current interpolated image In(t). This is replaced, in a step 68 which is also illustrated in the diagram of FIG. 11, with the previous original image Or(t−T) for the purpose of displaying the latter according to the principle of frame repetition. In addition, the algorithm must be reset. This is why the values of the pixels of the image Or(t+T) are saved in the memory space MOR1 and the procedure returns to the reset step 62.

In the absence of a scene cut, the procedure returns to step 63 of decoding the next original image, so as to continue the method by a further recurrence of the algorithm, for which t will be equal to t+2T (t=t+2T).

The scene cut is detected at step 67 in the manner that will now be proposed.

For each pixel block of the current interpolated image In(t), it will be determined if the two tests below are confirmed:

$$\begin{cases} MSE(\text{In}(t)) > VAR(\text{In}(t)) \\ MSE(\text{In}(t)) \geq 256 \end{cases} \quad (10)$$

where MSE(In(t)) is the mean square error of the pixel block In(t), given by the following relation:

$$MSE(\text{In}(t)) = \sum_{j=1}^{N} \sum_{i=1}^{M} \frac{(\text{In}(i, j, t) - PI(i, j, t-T))^2}{N \times M} \quad (11)$$

and where VAR(In(t)) is the variance given by the following relation:

$$255 \cdot VAR(\text{In}(t)) = \sum_{j=1}^{N} \sum_{i=1}^{M} \text{In}(i, j, t) - \frac{\left(\sum_{j=1}^{N} \sum_{i=1}^{M} \text{In}(i, j, t)\right)^2}{256} \quad (12)$$

If the two tests defined by the above relationships (10) are confirmed for each pixel block of the current interpolated image ln(t), then it would be considered that a scene cut has been detected.

In practice, it has been confirmed that the invention described above makes it possible to obtain interpolated images of high quality, determined by the PSNR (picture signal-noise ratio).

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method of interpolating images comprising:
   receiving a sequence of video images for interpolation between a first original image (Or(t−T)) and a second original image (Or(t+T)) of the sequence, wherein the interpolation includes estimation of at least one motion vector associated with at least one pixel of a current interpolated image (In(t));
   oversampling the video images; and
   displaying the video images which has been oversampled;
   wherein the estimation of the motion vector associated with a given pixel block (B(x,y)) of a current interpolated image includes:
   a) preselecting a given number P of first motion vectors associated respectively with first other pixel blocks (B(x−1,y), B(x,y−1)) that are adjacent to the given pixel block in the current interpolated image, where P is an integer, for which there is already an estimated motion vector;
   b) preselecting a given number Q of second motion vectors associated respectively with second other pixel blocks (B(x+1,y), B(x,y+1)) that are adjacent to the given pixel block in a previous interpolated image (In(t−2T)), where Q is an integer; and
   c) selecting, from the first motion vectors and the second motion vectors, the motion vector which minimizes a cost function between:
   pixels of a first given pixel block, which is pointed into the first original image by the motion vector from the given pixel blocks of the current interpolated image; and
   pixels of a second given pixel blocks, which is pointed into the second original image by a symmetrical vector of the motion vector from the given pixel block of the current interpolated image.

2. The method according to claim 1, wherein the estimation of the motion vector associated with the given pixel block further comprises:
   d) generating a given number K of corrected motion vectors, wherein each corrected motion vector corresponds to the motion vector previously selected to minimize the cost function and assigned a respective given pair of correction values;
   e) selecting from the corrected motion vectors that minimizes the cost function is selected from the corrected motion vectors; and
   f) replacing the motion vector selected at step c) with the corrected motion vector selected at step e).

3. The method according to claim 2, characterized in that, at step f), the motion vector selected at step c) is replaced with the corrected motion vector selected at step e) only if the corrected motion vector has a corresponding a value less than a value of the cost function.

4. The method according to claim 1, characterized in that the cost function is defined from a sum-of-the-absolute-differences estimator given by:

$$SAD_{m,n} = \sum_{j=1}^{N} \sum_{i=1}^{M} |P1(i-m, j-n, t-T) - P2(i+m, j+n, t+T)|$$

where P1(i,j,t−T) denotes a value of a pixel of indices i and j of the first given pixel block of the first original image (Or(t−T));

where P2(i,j,t+T) denotes a value of a pixel of indices i and j of the second given pixel block of the second original image (Or(t+T)); and where m and n are relative integers which denote the coordinates of the motion vector.

5. The method according to claim 2, characterized in that the correction values are additive coefficients defined, from a value of a pair of coordinates m,n of the motion vector, by all pairs of coordinates m±m1,n±n1, where m1 is an integer taking all values between 0 and M1, where n1 is an integer taking all values between 0 and N1, and where M1 and N1 are given non-zero integers.

6. The method according to claim 1, characterized in that the second other pixel blocks are different from the first other pixel blocks.

7. The method according to claim 1, characterized in that at least one of the first other pixel blocks and the second other pixel blocks are adjacent to the given pixel block in the video images.

8. The method according to claim 1, characterized in that at least one of P and Q is equal to 2.

9. The method according to claim 7, characterized by:
indices identifying a position of the given pixel block in the video images by x and y; and
indices identifying at least one of:
positions of the two first other pixel blocks by x and y−1 and by x−1 and y, respectively; and
positions of the two second other pixel blocks are identified by x+1 and y and by x and y+1 respectively.

10. The method according to claim 1, characterized in that a value of at least one pixel of the current interpolated image is given by:

$$Pin(i, j, t) = \frac{1}{2}(P1(i-m, j-n, t-T) + P2(i+m, j+n, t+T))$$

where Pin(i,j,t) denotes a pixel of indices i and j of the current interpolated image;

where P1(i−m,j−n,t−T) denotes a value of a pixel of indices i−m and j−n of the first original image;

where P2(i+m,j+n,t+T) denotes a value of a pixel of indices i+m and j+n of the second original image; and where m and n denote coordinates of the motion vector associated with a pixel block to which a pixel belongs.

11. The method according to claim 1, characterized in that a value of at least one pixel of the current interpolated image is given by the following relation:

$$Pin(i, j, t) = median(P1(i, j, t-T), P2(i, j, t+T),$$
$$\frac{1}{2}(P1(i-m, j-n, t-T) + P2(i+m, j+n, t+T)))$$

where Pin(i,j,t) denotes the pixel of indices i and j of the current interpolated image;

where P1(i−m,j−n,t−T) denotes the value of the pixel of indices i−m and j−n of the first original image;

where P2(i+m,j+n,t+T) denotes the value of the pixel of indices i+m and j+n of the second original image;

where m and n denote the coordinates of the motion vector associated with the pixel block to which the pixel belongs; and where median(z) denotes the value of a median filter function of the variable z.

12. The method according to claim 1, characterized in that a value of at least one pixel of the current interpolated image is given by the following relation:

$$Pin(i, j, t) = median(P1(i-m, j-n, t-T), P2(i+m, j+n, t+T),$$
$$\frac{1}{2}(P1(i, j, t-T) + P2(i, j, t+T)))$$

where Pin(i,j,t) denotes the pixel of indices i and j of the current interpolated image;

where P1(i−m,j−n,t−T) and P1(i,j,t−T) denote the value of the pixel of indices i−m and j−n and the value of the pixel of indices i and j, respectively, of the first original image;

where P2(i+m,j+n,t+T) and P(i,j,t+T) denote the value of the pixel of indices i+m and j+n and the value of the pixel of indices i and j, respectively, of the second original image;

where m and n denote the coordinates of the motion vector associated with the pixel blocks to which the pixel belongs; and where median(z) denotes the value of the median filter function of the variable z.

13. The method according to claim 1, characterized in that a value of at least one pixel of the current interpolated image is given by the following relation:

$$Pin(i, j, t) = \frac{1}{2}\left(\frac{1}{2}(P1(i, j, t-T) + P2(i, j, t+T)) + \frac{1}{2}(P1(i-m, j-n, t-T) + P2(i+m, j+n, t+T))\right)$$

where Pin(i,j,t) denotes the pixel of indices i and j of the current interpolated image;

where P1(i−m,j−n,t−T) and P1(i,j,t−T) denote the value of the pixel of indices i−m and j−n and the value of the pixel of indices i and j, respectively, of the first original image;

where P2(i+m,j+n,t+T) and P(i,j,t+T) denote the value of the pixel of indices i+m and j+n and the value of the pixel of indices i and j, respectively, of the second original image; and where m and n denote the coordinates of the motion vector associated with the pixel block to which the pixel belongs.

14. The method according to claim 1, characterized in that a value of at least one pixel of the current interpolated image is given by the following relation:

$$Pin(i,j,t) = median(P_{stat}(i,j,t), P_{dyn}(i,j,t), P_{mid}(i,j,t))$$

where Pstat(i,j,t), Pdyn(i,j,t) and Pmid(i,j,t) are values given by the following relations $$Pstat(i,i,t)=$$

$$Pin(i, j, t) = median(P1(i, j, t-T), P2(i, j, t+T),$$
$$\frac{1}{2}(P1(i-m, j-n, t-T) + P2(i+m, j+n, t+T)))$$

where Pin(i,j,t) denotes the pixel of indices i and j of the current interpolated image;

where P1(i−m,j−n,t−T) denotes the value of the pixel of indices i−m and j−n of the first original image:

where P2(i+m,j+n,t+T) denotes the value of the pixel of indices i+m and j+n of the second original image;

where m and n denote the coordinates of the motion vector associated with the pixel block to which the pixel belongs; and where median(z) denotes the value of a median filter function of the variable z;

$$Pdyn(i,j,t)=$$

$$Pin(i, j, t) = median(P1(i-m, j-n, t-T), P2(i+m, j+n, t+T),$$
$$\frac{1}{2}(P1(i, j, t-T) + P2(i, j, t+T)))$$

where Pin(i,j,t) denotes the pixel of indices i and j of the current interpolated image;

where P1(i−m,j−n,t−T) and P1(i,j,t−T) denote the value of the pixel of indices i−m and j−n and the value of the pixel of indices i and j, respectively, of the first original image; where P2(i+m,j+n,t+T) and P(i,j,t+T) denote the value of the pixel of indices i+m and j+n and the value of the pixel of indices i and j, respectively, of the second original image;

where m and n denote the coordinates of the motion vector associated with the pixel blocks to which the pixel belongs; and where median(z) denotes the value of the median filter function of the variable z; and $$Pmid(i,j,t)=$$

$$Pin(i, j, t) = median(P1(i-m, j-n, t-T), P2(i+m, j+n, t+T),$$
$$\frac{1}{2}(P1(i, j, t-T) + P2(i, j, t+T)))$$

where Pin(i,j,t) denotes the pixel of indices i and j of the current internolated image;

where P1(i−m,j−n,t−T) and P1(i,j,t−T) denote the value of the pixel of indices i−m and j−n and the value of the pixel of indices i and j, respectively, of the first original image;

where P2(i+m,j+n,t+T) and P(i,j,t+T) denote the value of the pixel of indices i+m and j+n and the value of the pixel of indices i and j, respectively, of the second original image;

where m and n denote the coordinates of the motion vector associated with the pixel blocks to which the pixel belongs; and where median(z) denotes the value of the median filter function of the variable z.

15. A device for interpolating images comprising:

a receiver to receive a sequence of video images for interpolation between a first original image (Or(t−T)) and a second original image (Or(t+T)) of the sequence, wherein the interpolation includes a means for estimating at least one motion vector associated with at least one given pixel block (B(x,y)) of a current interpolated image (In(t));

wherein the means for estimating the at least one a motion vector associated with the at least one given pixel block (B(x,y)) of the current interpolated image includes:

first preselecting means for preselecting a given number P of first motion vectors associated respectively with first other pixel blocks (B(x−1,y), B(x,y−1)) that are adjacent to the given pixel block in the current interpolated image, where P is an integer, for which there is already an estimated motion vector;

second preselecting means for preselecting a given number Q of second motion vectors associated respectively with second other pixel blocks (B(x+1,y), B(x,y+1)) that are adjacent to the given pixel block in the previous interpolated image (In(t−2)), where Q is an integer; and first selecting means for selecting, from the first motion vectors and the second motion vectors, the motion vector which minimizes a cost function between:

pixels of a first given pixel block, which is pointed into the first original image by the motion vector from the given pixel blocks of the current interpolated image; and pixels of a second given pixel blocks, which is pointed into the second original image by a symmetrical vector of the motion vector from the given pixel block of the current interpolated image.

16. The device according to claim 15, wherein the estimation means further comprise:

generating means for generating a given number K of corrected motion vectors, wherein each corrected motion vector corresponds to the motion vector previously selected to minimize the cost function and assigned a respective given pair of correction values;

selecting means for selecting from the corrected motion vectors that minimizes the cost function is selected from the corrected motion vectors; and replacing means for replacing the motion vector selected by the first selection means with the corrected motion vector selected the second selection means.

17. The device according to claim 15, wherein the replacing means includes replacing the motion vector selected by the first selection means with the corrected motion vector selected at the second selection means only if the corrected motion vector has a corresponding a value less than a value of the cost function.

18. The device according to claim 15, characterized in that the cost function is defined from a sum-of-the-absolute-differences estimator given by:

$$SAD_{m,n} = \sum_{j=1}^{N}\sum_{i=1}^{M} |P1(i-m, j-n, t-T) - P2(i+m, j+n, t+T)|$$

where P1(i,j,t−T) denotes a value of a pixel of indices i and j of the first given pixel block of the first original image (Or(t−T));

where P2(i,j,t+T) denotes a value of a pixel of indices i and j of the second given pixel block of the second original image (Or(t+T)); and where m and n are relative integers which denote the coordinates of the motion vector.

19. The device according to claim 16, characterized in that the correction values are additive coefficients defined, from a value of a pair of coordinates m,n of the motion vector, by all pairs of coordinates m±m1, n±n1, where m1 is an integer taking all values between 0 and M1, where n1 is an integer taking all values between 0 and N1, and where M1 and N1 are given non-zero integers.

20. The device according to claim 15, characterized in that the second other pixel blocks are different from the first other pixel blocks.

21. The device according to claim 15, further comprising:
   a communicating terminal including:
      receiving means for receiving coded data corresponding to the video images;
      decoding means for decoding coded data received by the receiving means;
      means for oversampling the video; and
      display means for displaying the oversampled video.

22. A communicating terminal comprising:
   a receiver to receive a sequence of coded data corresponding to video images for interpolation between a first original image (Or(t−T)) and a second original image (Or(t+T)) of the sequence, wherein the interpolation includes a means for estimating at least one motion vector associated with at least one given pixel block (B(x,y)) of a current interpolated image (In(t));
   decoding means for decoding coded data received by the receiving means;
   means for oversampling the video; and
   display means for displaying the oversam pled video;
   wherein the means for estimating the at least one motion vector associated with the at lease one given pixel block (B(x,y)) of the current interpolated image includes:
   first preselecting means for preselecting a given number P of first motion vectors associated respectively with first other pixel blocks (B(x−1,y), B(x,y−1)) that are adjacent to the given pixel block in the current interpolated image, where P is an integer, for which there is already an estimated motion vector;
   second preselecting means for preselecting a given number Q of second motion vectors associated respectively with second other pixel blocks (B(x+1,y), B(x,y+1)) that are adjacent to the given pixel block in the previous interpolated image (In(t−2T)), where Q is an integer; and
   first selecting means for selecting, from the first motion vectors and the second motion vectors, the motion vector which minimizes a cost function between:
      pixels of a first given pixel block, which is pointed into the first original image by the motion vector from the given pixel blocks of the current interpolated image; and
      pixels of a second given pixel blocks, which is pointed into the second original image by a symmetrical vector of the motion vector from the given pixel block of the current interpolated image.

* * * * *

UNITED STATES PATENT AND TRADEMARK OFFICE
CERTIFICATE OF CORRECTION

PATENT NO. : 7,302,003 B2  
APPLICATION NO. : 10/654582  
DATED : November 27, 2007  
INVENTOR(S) : Andrea Battistella Page 1 of 1

It is certified that error appears in the above-identified patent and that said Letters Patent is hereby corrected as shown below:

Col. 22, Line 32

From "(In(t-2))" to -- (In(t-2T)) --

Signed and Sealed this

Eighth Day of April, 2008

JON W. DUDAS  
*Director of the United States Patent and Trademark Office*